March 29, 1938.   J. L. CLOUDSLEY   2,112,763
VARIABLE SPEED POWER TRANSMISSION MECHANISM
Filed Dec. 27, 1934   4 Sheets-Sheet 1
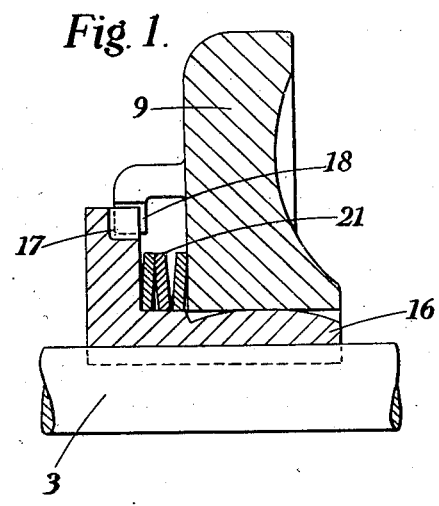
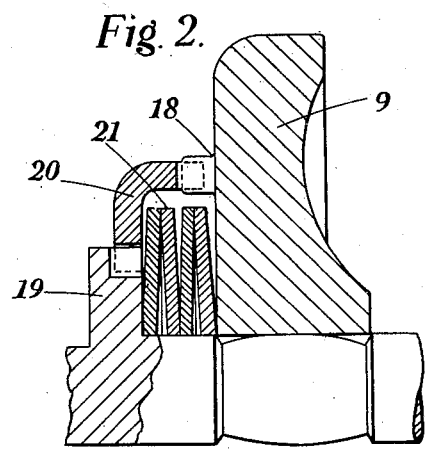

March 29, 1938. J. L. CLOUDSLEY 2,112,763
VARIABLE SPEED POWER TRANSMISSION MECHANISM
Filed Dec. 27, 1934 4 Sheets-Sheet 2

INVENTOR
J. L. Cloudsley
BY
G. F. Windroth
ATTORNEY

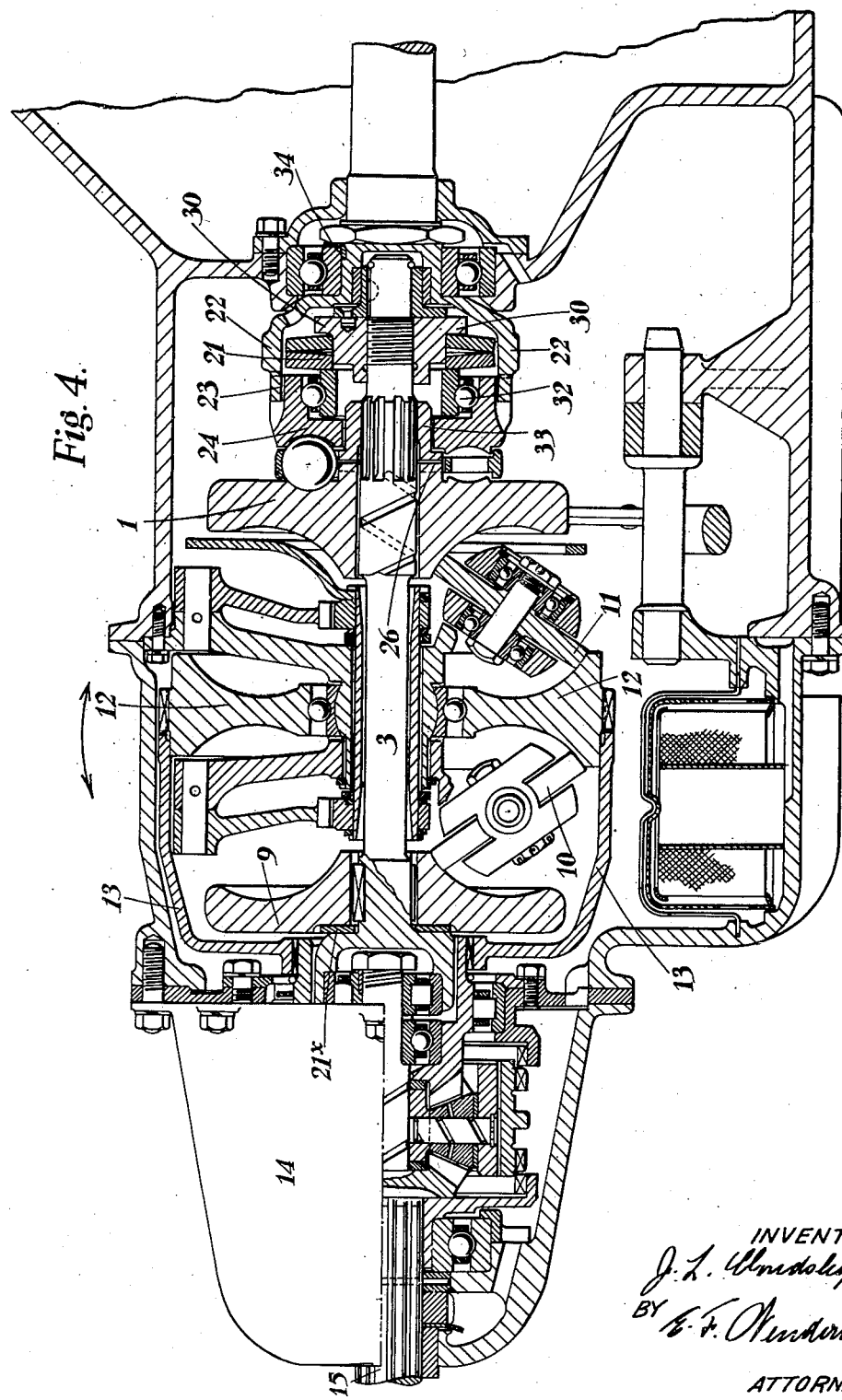

Patented Mar. 29, 1938

2,112,763

UNITED STATES PATENT OFFICE 2,112,763

VARIABLE SPEED POWER TRANSMISSION MECHANISM

John Leslie Cloudsley, London, England

Application December 27, 1934, Serial No. 759,384
In Great Britain December 28, 1933

10 Claims. (Cl. 74—208)

This invention relates to variable speed power transmission mechanism and has particular reference to mechanism of the known kind in which power is transmitted between co-axial driving and driven disks having torus tracks formed on opposing faces for frictional engagement with interposed rockable rollers.

For convenience of description but without implying limitation of the invention thereto, I will refer to one particular embodiment of mechanism of the toric disk and roller type, namely, an embodiment comprising co-axial outer disks with toric tracks on their opposing faces, and an interposed disk having a toric track on each face to form two pairs of tracks with the tracks on the adjacent outer disks, the intermediate or driven disk receiving power from the outer or driving disks by two sets of interposed friction rollers.

Axial compressing pressure is applied to and maintained on such an assembly by a torque-responsive pressure device of the cam and ball type located in front of the front (or driving) disk, i. e., the disk that lies nearest to the power input end.

Practical experience with certain mechanisms of the above-mentioned kind has shown that occasionally certain unwanted vibrations or tremors and/or undue strains or stresses arise, the exact cause or explanation of which it is difficult to determine. Without limiting myself to any particular theory I believe that the unwanted effects may be divided into two main classes, namely, those due to manufacturing irregularities and those incidental to actual operation.

In such mechanisms it is important that the tangential loads taken by the respective rollers of a set should be equal and also that the tangential loads taken by the respective sets of rollers should be equal and it is known to provide means for such equalization. It is, however, equally important to equalize the diametrical loads on the rollers to ensure the same adhesion or tangential load capacity at their contacting points with the disks.

With regard to unwanted effects due to manufacturing irregularities I believe these to be due at least in part to the fact that although the rollers of each set may be equally spaced angularly around the torus tracks and may have their tangential thrusts equalized, one roller may be slightly larger in diameter than the others and thereby transmit a disproportionately great force diametrically across it from one disk to the other and cause deflection of the shaft on which the disks are mounted. The deflecting force is a maximum when the rollers are in the position of lowest speed ratio for the output shaft. A further reason for the unwanted effects may be due to disalignment as between the disks, the shaft and the sets of rollers. A still further cause of disturbance may be due to discrepancies in the profile of the raceways of the balls in the cam and ball pressure device.

One of the chief objects, therefore, of the present invention is to provide for self-alignment or self-setting of the various parts that apply and sustain the axial pressure necessary to maintain uniform adhesion of the rollers on the disk faces.

One feature of the present invention consists in compensating for slight variations of roller diameters by mounting one or each of the outer disks on a part spherical or convex bearing or equivalent universal bearing within limits instead of on a close fitting cylindrical bearing on the supporting shaft so that the disk can rock slightly out of the strictly transverse plane and also slide bodily along the shaft.

The mounting of the rear outer disk in the manner just stated should, with the aid of the free or rockable mounting of the intermediate disk, permit of a self-adjustment sufficient to compensate for slight disparity of roller diameters of the rear set of rollers and avoid bending strain or deflection of the shaft due to such disparity, but I prefer to provide a similar mounting at the front end of the disk and roller assembly for the front outer disk. The front outer disk in the particular embodiment of torus disk type of mechanism above mentioned is usually a close sliding fit on the central shaft of the assembly and receives its drive from the clutch shaft of the engine entirely by way of a toothed coupling collar or cupped extension of said shaft and a torque responsive pressure device acting on said disk, and in adapting this construction to my invention I preferably make this assembly yieldable as hereinafter described and extend an inner collar located between the aforesaid coupling collar and the supporting shaft so that said inner collar reaches under the front outer disk and affords a bearing therefor of the universal character referred to.

With regard to unwanted effects developing during actual operation, I have devised several modifications of the hitherto known construction to compensate or eliminate them. Hitherto it has been the practice in mechanisms of the torus disk and roller type to provide means, usually in the form of Belleville or similar spring washers, for applying an initial amount of endwise or axial pressure between the disks and rollers and to employ a device of the cam and triple ball type to apply to the front end disk pressure during operation responsive to torque as already stated. I have found that it is highly advantageous to place spring washers between the usual pressure loading nut at the front end of the central shaft and the thrust race in front of the cam and ball pressure device. It is also advantageous to use washers of sufficient strength to be resilient during substantially all phases of operation. The so-called torque ring of the pressure device may advantageously serve not only as the front member of the cam and ball pressure device but also as the rear member of the thrust race and as the drive-receiving member to the front disk. Moreover, this ring and the companion ring of the thrust race are preferably formed to serve as a double-purpose race.

Without limiting myself to any theory of operation I believe the foregoing improvements to give improved results for the following reason:—In the known construction with spring washers at the rear of the rear disk any sudden driving shocks were taken up by transmission to the torque ring and thence to the thrust race and loading nut on the central shaft and thence along the central shaft to its rear and to the spring washers at that end. This was a long transmission path and involved an actual axial displacement of the central shaft and the overcoming of the inertia thereof and of the friction at the bearing surfaces of the disks on the central shaft, which friction can be quite serious especially if there is any disalignment of disks and shaft as hereinbefore explained, whereas according to the present improvement absorption of sudden driving shocks takes place directly in the spring washers now at the front end where they serve as input shock absorbers with respect to the torus disk transmission. Moreover, the torque ring being rockable against the spring washers can therefore be self-adjustable to compensate for mechanical irregularities of shape or setting of the disks and rollers and of its own cam surfaces without losing its capacity to exert uniform pressure on the front disk owing to the three point application of pressure through the three balls. If in addition the front disk itself has a universal type of bearing with respect to the central shaft, this disk together with the torque ring and the intervening balls can rock as a self-aligning unit.

It may be mentioned that the undesirable effects arising from the various causes above discussed usually make their final appearance in the tangential load-equalizing mechanism of the rollers, and can be felt or seen as vibration or chatter of this mechanism.

The foregoing features of the present invention will now be described more fully with reference to the accompanying drawings in which:—

Figure 1 is a sectional elevation of a rear end disk with universal bearing in accordance with the invention.

Figure 2 is a sectional elevation similar to Figure 1 but showing a slight modification.

Figure 4 is a longitudinal sectional elevation of a complete gear with reversing mechanism.

Figure 3:
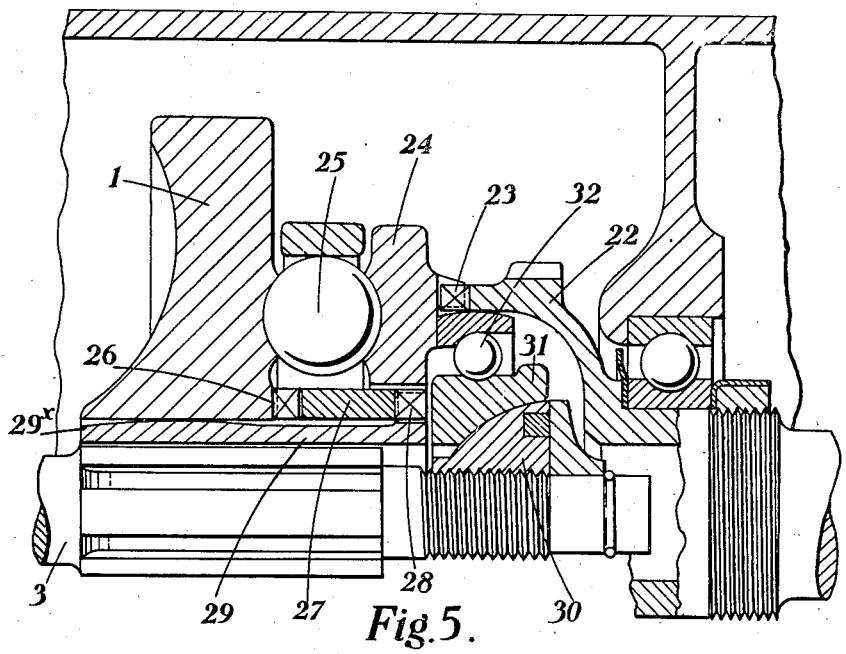
Figure 3 is a sectional elevation of a front end disk and associated parts illustrating certain features of the present invention.

The general arrangement of a variable speed power transmission mechanism of the torus disk and roller type is to be seen in Figure 4. Power from the engine is transmitted from a driving or engine clutch shaft (seen to the right of Figure 4) to the front end torus disk as hereinafter described and thence through the central shaft 3 to the rear end torus disk 9 and passes from the disks 1 and 9 by way of the two sets of non-planetary rollers 10 and 11 to the rockably-mounted intermediate double-faced torus disk 12. From the disk 12 the power is taken off by the cylindrical cage or shell 13 to the reversing gear box 14 and thence to the output shaft 15.

Referring now more particularly to Figures 1 and 2 it is seen that the rear end disk 9 of a variable speed power transmission mechanism of the torus disk and roller type as hereinbefore referred to bears on a part-spherical flange or sleeve 16 on the main central shaft 3 of the mechanism in such a way as to be able to rock slightly and also be free to slide bodily along the sleeve. According to Figure 1 the flange 16 is keyed to the shaft 3 and is formed with dogs 17 which interlock with dogs 18 on the rear face of the disk 9 so that the drive from the shaft 3 is transmitted to the disk 9 but the latter can nevertheless rock and slide on its part-spherical bearing to accommodate itself to irregularities of manufacture as already explained. In this figure there are shown between the sleeve 16 and the flange 19 a group of Belleville washers 21 which apply axial pressure on the rear face of the rear disk and therefore also between the disks and their rollers. Such pressure is, however, also preferably applied on the front face of the front disks as hereinafter described.

The construction shown in Figure 2 is similar to that in Figure 1 but the disk 9 bears on a part spherical surface on the shaft itself and the drive from the shaft takes place from an integral flange 19 through a separate dog coupling member 20 to the dogs 18 on the rear of the disk 9.

Figure 3 shows a form of universal or part-spherical bearing for the front disk 1. The power from the engine passes from the cupped end 22 of the engine clutch shaft through the teeth or dogs 23 entirely to the cam-faced pressure applying ring 24 and thence across the balls 25 to the front torus disk 1. Half of the power received by the disk 1 goes across the rollers to the disk 12 and the other half is transmitted from said disk through the dogs 26 to a coupling sleeve 27 and dogs 28 to a long sleeve 29 splined on the central shaft 3. The rear end of the sleeve 29 extends into the disk 1 and is formed with a part spherical surface 29$^x$ to give said disk the universal type of mounting already described.

It will be understood that owing to sleeve 29 being splined to the central shaft 3 the power reaches the rear disk 9 through said shaft and goes across the rollers to the disk 12.

As in the case of universal mounting of the rear disk it will be understood that the similar mounting of the front shaft eliminates or tends to eliminate unwanted effects due to irregularities of manufacture or assembly or alignment especially if the intermediate disk is rockably mounted so that the accommodation needed can be distributed fully from the front disk to the rear disk and vice versa.

Figure 3 shows an additional constructional feature of advantage in that the nut 30 screwed on the front end of the shaft 3 and adjusted to put the correct amount of initial end pressure on the disk and roller assembly has a part spherical outer surface offering a self-adjusting bearing for the inner member 31 of the thrust race 32 and thereby a certain degree of self-alignment for the torque ring itself. In this figure (Fig. 3) it is assumed that the initial pressure-applying spring washers are behind the rear torus disk as seen for example in Figures 1 and 2, although the preferable construction is to place them in front of the front disk.

The placing of the Belleville spring washers in front of the front torus disk is shown in Figures 4 to 7. In Figure 4 these washers 21 are seen located between the thrust race 32 and the pressure-adjusting nut 30. A single spring washer 21× is shown at the back of the rear torus disk 9 but it is not essential and serves only for a preliminary adjustment of end pressure during assembly, being just fully compressed by initial adjustment and thus serving as a known zero from which the end pressure by the more powerful washers 21 for operating conditions may be gauged.

The transmission of the power from the clutch shaft through its cupped end 22 to the central shaft 3 of the gear is generally speaking the same in Figures 4, 5, 6 and 7, but the following variations may be noted.

In Figure 4 the ring 24 of the torque responsive end pressure device is formed integrally with the outer member of the thrust race 32 and power is received entirely by the front torus disk 1 and transmitted thereby to the central shaft 3 by way of the dogs 26 and a splined sleeve 33.

It will be understood that the torque ring 24 serves as a drive-receiving member from the clutch shaft, also as the outer member of the thrust face, and also as part of the torque-responsive pressure device. As the torque ring 24 is capable of self-alignment and as the thrust race bears against the spring washers between it and the loading nut, and as these washers are preferably strong enough to be effectively resilient during all phases of operation, it follows that undesirable effects that might arise owing to any disparity of roller diameters in the disk and roller assembly, or to the torus track on any one of the disks being slightly out of coincidence with the actual plane of rotation, or to inaccuracy in the cam faces on which the balls in the pressure device roll, will be obviated by the accommodation afforded by the construction described.

In the construction of Figure 4 the front torus disk 1 may if desired be mounted on a part spherical surface on the shaft 3 as in Figures 2 and 3, but the provision of an oil duct as shown in Figure 4 renders a somewhat loose plain cylindrical bearing quite satisfactory as the play therein and the oil film give a universal bearing effect sufficient for the purpose.

The front end of the shaft 3 is shown supported freely in the cupped end 22 of the engine clutch shaft with the intervention of the bearing ring 34.

Figure 5:
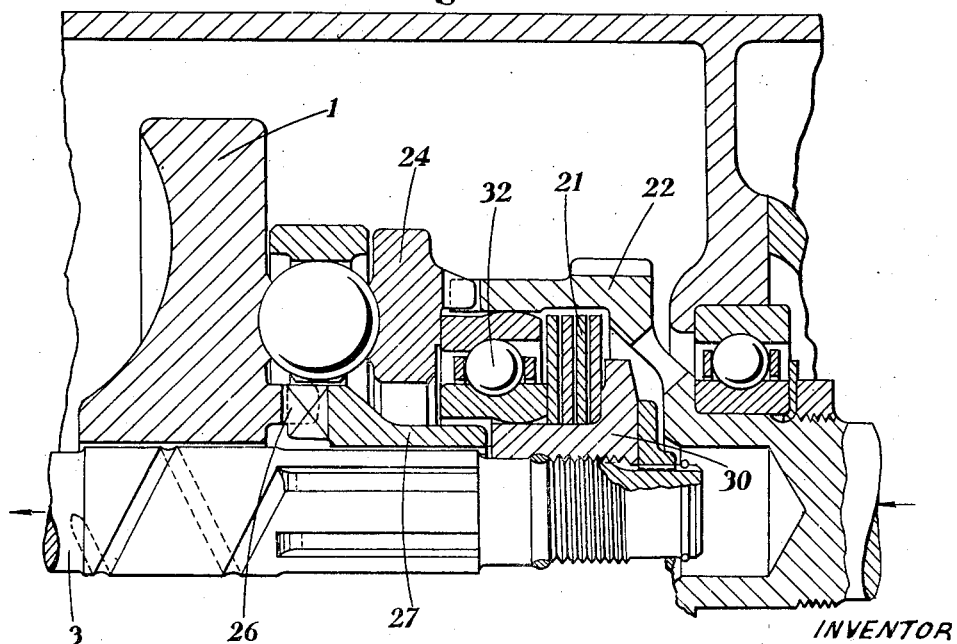
Figures 5, 6 and 7 are sectional elevations showing three further arrangements of a front end disk with torque-responsive pressure device and spring washers as hereinafter described.
Figure 6:
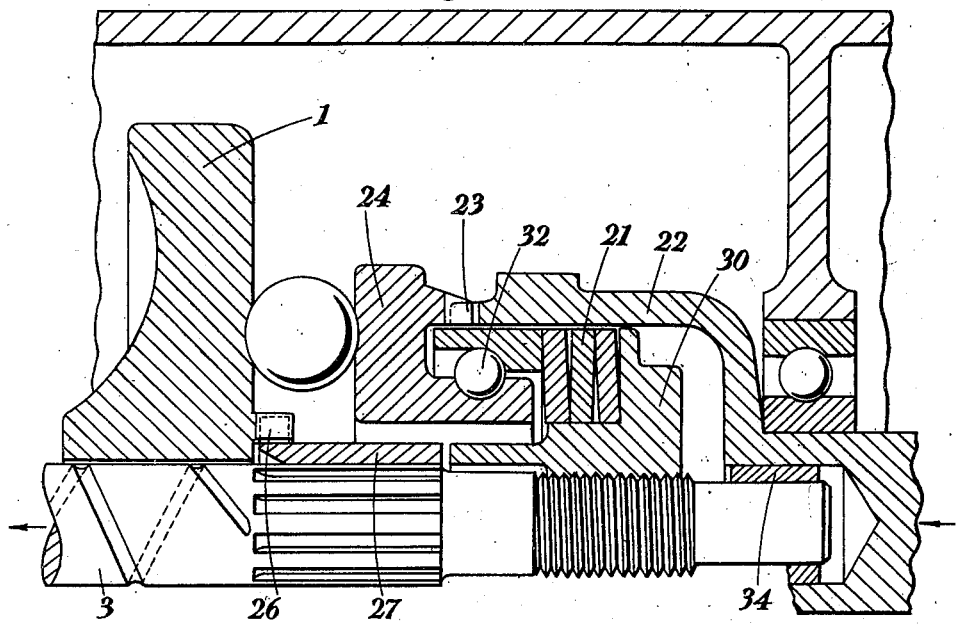
Figure 7:
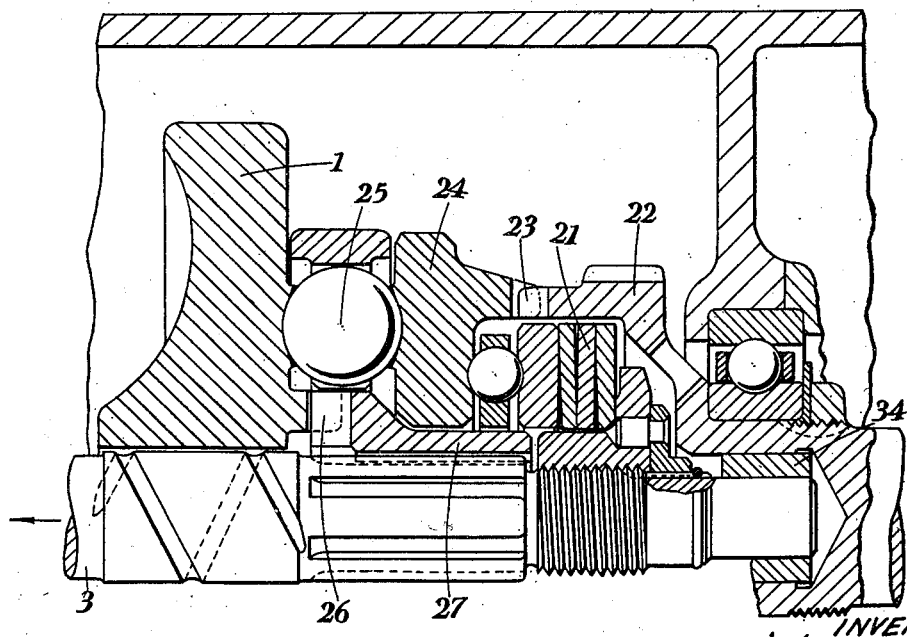

Figures 5, 6 and 7 show slight variations of the construction shown in Figure 4. In Figure 5 the torque ring 24 is of normal construction, and the thrust race 32 is supported by the cupped end 22 of the engine clutch shaft in which it is mounted with freedom to rock and slide. The spring washers 21 are located between the thrust race 32 and the loading nut 30.

In Figure 6 the ring 24 of the torque-responsive pressure device is formed to serve also as the inner member of the thrust race 32. In the construction shown in Figures 3, 4, 5 and 6 the thrust race is formed as a double purpose race, this being especially desirable in Figures 3 and 5 seeing that the forward end of the central shaft 3 is not supported in the cupped end 22 of the clutch shaft in those two constructions. In Figure 7 the race 32 is a plain trust race, one wall or face being constituted by the ring 24 and the other face member bearing direct against the spring washers 21.

In the construction shown in both Figure 6 and Figure 7 the front end of the central shaft 3 is mounted in the same way as in Figure 4.

As already explained, the location of the spring washers in front of the front torus disk presents several important advantages. The chief advantages may be itemized as follows:—

(a) By making the washers of sufficient strength or spring value they serve not merely as initial pressure-applying means for the toric gear parts but as shock absorption buffers during practically all phases of transmission and by being located as described they serve to equalize the applied load over both torus disks by eliminating lag of application of the drive as between one end disk and the other.

(b) Compression of the washers takes place as between the pressure-applying nut 30 and the ring 24 of the torque-responsive device and consequently there is no appreciable endwise movement of the shaft 3 (and consequently no friction between shaft 3 and the disks) as would occur with washers placed at the rear of the rear disk; also all applied pressure acts upon both end disks practically simultaneously.

(c) Tremulous variations of input torque are dealt with by variations of compression of the washers and these variations enable the "worrying" points of the balls on the pressure surfaces of the torque-responsive pressure-applying device to shift and thereby avoid concentrated wear or fatigue on specific points on such surfaces.

(d) The torque ring 24 is able to rock against the yieldability of the spring washers and by self-alignment compensate for irregularities in the cam surfaces and inaccuracies in the shape or setting or alignment of the disk rollers and central shaft as hereinbefore explained, especially if the front disk is also mounted with a small amount of universal freedom so that it and the torque ring can act as a self-aligning unit.

It will be appreciated that the capacity of the torque ring 24 to rock against the pressure of the spring washers 21 as arranged in Figures 4 to 7 coupled with the torque-responsive pressure-applying property of the torque ring causes this assembly of torque ring and spring washers to function as a torsionally resilient coupling as between the clutch shaft and the front torus disk. Without torsional and endwise resiliency provided in the various ways above described it is found that even the tangential load equalization control means mentioned in the fourth paragraph of this specification are unable to eliminate or obviate all disturbances and that such means themselves develop unwanted variations, whereas the resiliency afforded as described gives a complete solution of the problem.

What I claim is:—

1. Variable-speed power transmission mechanism comprising coaxial torus disks one of which serves as driving disk, intermediate rockable rollers, a torque-responsive pressure device carrying the entire torque acting on the driving disk, and a torque-ring forming part of said pressure device, in combination with a thrust race adjacent the pressure device on the side remote from the driving disk, one member of said thrust race being integral with the torque ring, and resilient axial pressure-applying means carrying the axial load at the maximum torque capacity of the transmission bearing against said pressure device through the intervention of the thrust race.

2. A variable-speed power transmission mechanism of the non-planetary type comprising two coaxial driving torus end disks, a coaxial rockable intermediate driven disk with a torus track on each face, a set of rockable friction rollers between each end disk and the intermediate disk, a driving shaft for driving the front end torus disk, a torque-responsive pressure device carrying the entire torque between said shaft and front end disk, a central shaft through which the drive is delivered to the rear end disk, means for taking off power from the intermediate disk as received from the end driving disks through the sets of rollers, a loading nut on the front end of said central shaft to compress the assembly of disks and rollers axially together, and axially resilient pressure-applying means carrying the axial load due to maximum torque interposed between the torque-responsive pressure device and the loading nut, said front end disk being capable of limited freedom of slight universal movement on said central shaft.

3. A variable-speed power transmission mechanism comprising two coaxial driving torus disks, a coaxial rockable intermediate driven disk with a torus track on each face, a set of rockable friction rollers between each end disk and the intermediate disk, a driving shaft for driving the front end torus disk, a torque-responsive pressure device carrying the entire torque between said shaft and front end disk, a central shaft through which the drive is delivered to the rear end disk, means for taking off power from the intermediate disk as received from the end driving disks through the sets of rollers, a loading nut on the front end of said central shaft to compress the assembly of disks and rollers axially together, and a plurality of Belleville washers carrying the axial load due to maximum torque interposed between the torque-responsive pressure device and the loading nut, said front end disk being capable of limited freedom of slight universal movement on said central shaft.

4. Variable-speed power transmission mechanism of the non-planetary type comprising coaxial torus disks one of which serves as driving disk, a universal mounting for said driving disk constituting a bearing therefor, intermediate rockable rollers, and a torque-responsive pressure device acting on said driving disk, in combination with resilient axial pressure-applying means bearing against said pressure device on the side thereof remote from the driving disk, said driving disk being capable of slight universal movement on its mounting.

5. Variable-speed power transmission mechanism comprising two coaxial torus disks one of which serves as driving disk, a coaxial intermediate driven disk with a torus track on each face, rockable rollers intermediate said disks, torque responsive end loading means therefor situated in front of said driving disk said loading means including a torque ring to which the whole of the input torque is delivered and from which the whole of it passes to the driving disk, and resilient axial pressure-applying means in front of said torque ring.

6. Variable-speed power-transmission mechanism comprising two coaxial torus disks one of which serves as driving disk, a coaxial intermediate driven disk with a torus track on each face, rockable rollers intermediate said disks which rollers are spontaneously precessible, torque responsive loading means therefor situated on the input side of the input disk, a torque ring for said loading means, and resilient axial pressure applying means on the input side of said torque ring to which ring the whole of the input torque is delivered and from which the whole of said torque passes to said input disk.

7. Variable-speed power-transmission mechanism comprising a central transmission shaft, two co-axial torus disks one of which serves as driving disk, a coaxial intermediate driven disk with a torus track on each face, rockable rollers intermediate said disks which rollers are spontaneously precessible, torque responsive loading means therefor situated on the input side of the input disk, a torque ring for said loading means, an engine clutch shaft coaxial with but separate from said central shaft and serving to deliver torque to said torque ring, and resilient axial pressure applying means on the input side of said torque ring to which ring the whole of the input torque is delivered and from which the whole of said torque passes to said input disk.

8. A variable-speed power transmission mechanism of the non-planetary type comprising two coaxial driving torus end disks, a coaxial intermediate driven disk with a torus track on each face, a set of rockable friction rollers between each end disk and the intermediate disk, a driving shaft for driving the front end torus disk, a torque-responsive pressure device between said shaft and front end disk, a central shaft through which the drive is delivered to the rear end disk, means for taking off power from the intermediate disk as received from the end driving disks through the sets of rollers, a loading nut on the front end of said central shaft to compress the assembly of disks and rollers axially together, and axially resilient pressure-applying means interposed between the torque-responsive pressure device and the loading nut, said intermediate disk being capable of limited freedom of slight universal movement on said central shaft.

9. A variable-speed power transmission mechanism comprising two coaxial driving torus disks, a coaxial intermediate driven disk with a torus track on each face, a set of rockable friction rollers between each end disk and the intermediate disk, a driving shaft for driving the front end torus disk, a torque-responsive pressure device between said shaft and front end disk, a central shaft through which the drive is delivered to the rear end disk, means for taking off power from the intermediate disk as received from the end driving disks through the sets of rollers, a loading nut on the front end of said central shaft to compress the assembly of disks and rollers axially together, and a plurality of Belleville washers interposed between the torque-responsive pressure device and the loading nut, said intermediate disk being capable of limited freedom of slight universal movement on said central shaft.

10. A variable speed power transmission mechanism comprising two coaxial driving torus end disks, a coaxial rockable intermediate driven disk having a torus track on each face thereof, a set of rockable friction rollers between each end disk and said intermediate disk, torque loading means located on the input side coacting with one of said end disks, a torque ring for said loading means and resilient axial pressure applying means carrying the axial load due to torque located at the input side of said torque ring to which ring the whole of the input torque is delivered and from which the whole of said torque passes to said input disk.

JOHN LESLIE CLOUDSLEY.